Figure 1:
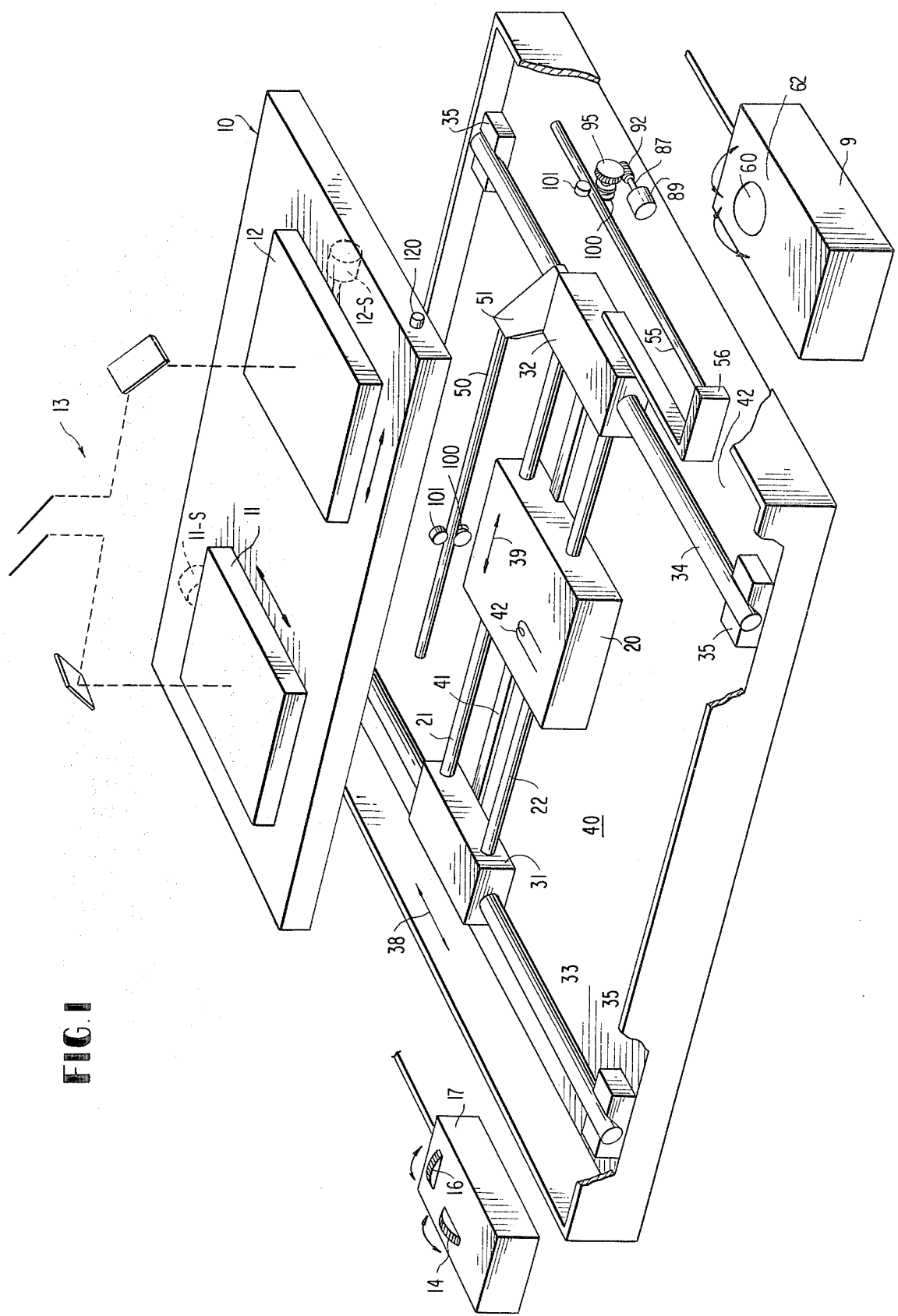

United States Patent [19]

Bunn et al.

[11] 4,233,740
[45] Nov. 18, 1980

[54] PHOTOGRAMMETRIC PLOTTER AND CONSTRAINT FREE DRIVE SYSTEM THEREFORE

[75] Inventors: Robert F. Bunn, Clinton, Md.; Clifford W. Greve, Arlington, Va.

[73] Assignee: Autometric Incorporated, Beltsville, Md.; by said Clifford W. Greve

[21] Appl. No.: 12,689

[22] Filed: Feb. 16, 1979

[51] Int. Cl.³ .................... F16H 27/02; G02B 27/22
[52] U.S. Cl. ................................. 33/1 A; 33/1 M; 33/20 D; 74/89
[58] Field of Search .................. 308/3 A, 3 R, 4 R; 356/2; 33/1 M, 1 A, 20 D; 353/6, 7; 74/89; 108/143; 350/136; 346/29; 250/202

[56] References Cited

U.S. PATENT DOCUMENTS

| | | | |
|---|---|---|---|
| 1,756,062 | 4/1930 | Holst | 350/136 |
| 1,926,828 | 9/1933 | Van Berkel | 308/3 A |
| 3,434,218 | 3/1969 | Potter | 33/1 M |
| 3,519,827 | 7/1970 | Chitnyal | 350/136 |
| 3,926,062 | 12/1975 | Neff | 74/89 |
| 3,989,933 | 11/1976 | Inghilleri | 33/1 A |

FOREIGN PATENT DOCUMENTS

| | | | |
|---|---|---|---|
| 963921 | 5/1957 | Fed. Rep. of Germany | 33/1 A |
| 1043374 | 11/1953 | France | 308/3 A |
| 300046 | 8/1932 | Italy | 274/13 R |
| 893929 | 4/1962 | United Kingdom | 33/1 M |

OTHER PUBLICATIONS

Pulfrich, Stereo-Komparator, Zeitschrift fur Instrumentenkunde, Mar. 1902, XXII, pp. 75-76.

*Primary Examiner*—John W. Shepperd
*Attorney, Agent, or Firm*—Jim Zegeer

[57] ABSTRACT

A photogrammetric plotter having a photocarriage which is supported on a trolley carried by a first set of way bars which in turn are supported from the trolley element on a second set of way bars mounted on a base for viewing by binocular optical system of a pair of stereo photos on a pair of photo carriers on the photocarriage. A constraint free drive apparatus is provided for driving the photocarriage along each of the set of way bars each of constraint free drive apparatus including a drive rod supported, in a preferred embodiment on the trolley supporting the photocarriage, and at only one end of the drive rod is displaceable in a direction transverse of the longitudinal axis of the drive rod but not displaceable axially of the drive rod. A drive assembly constituted by V drive wheel and a servo motor driving the drive wheel engage the drive rod, and a clutch means constituted by a spring-solenoid controlled cam member permit the rapid engagement and disengagement of the drive rod with the drive wheel. Each photo carrier stage is supported on a set of way bars, the left stage being adjustable by a servo motor in the Y ordinate (Delta Y) and the right stage is adjustable by a servo motor in the X ordinate (Delta X).

14 Claims, 6 Drawing Figures

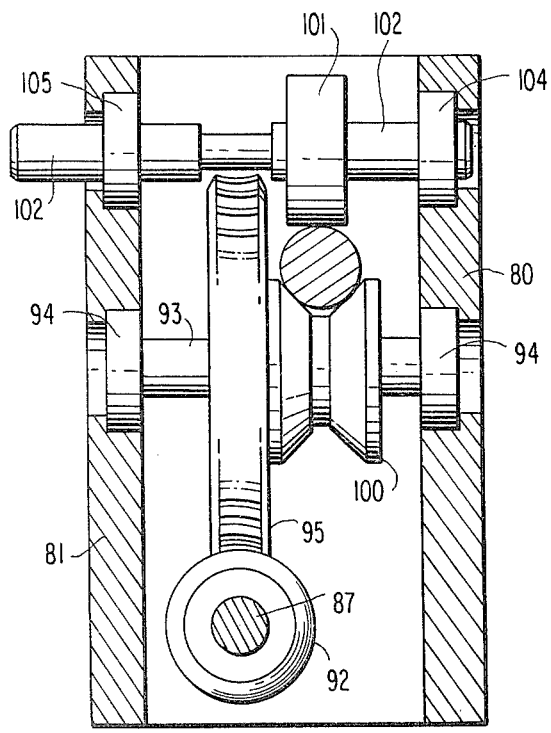
FIG. 2
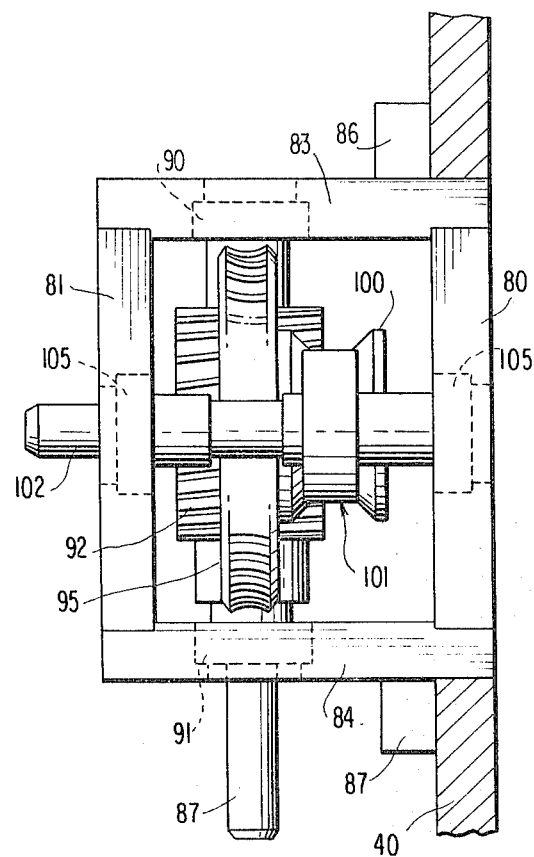
FIG. 3
FIG. 4
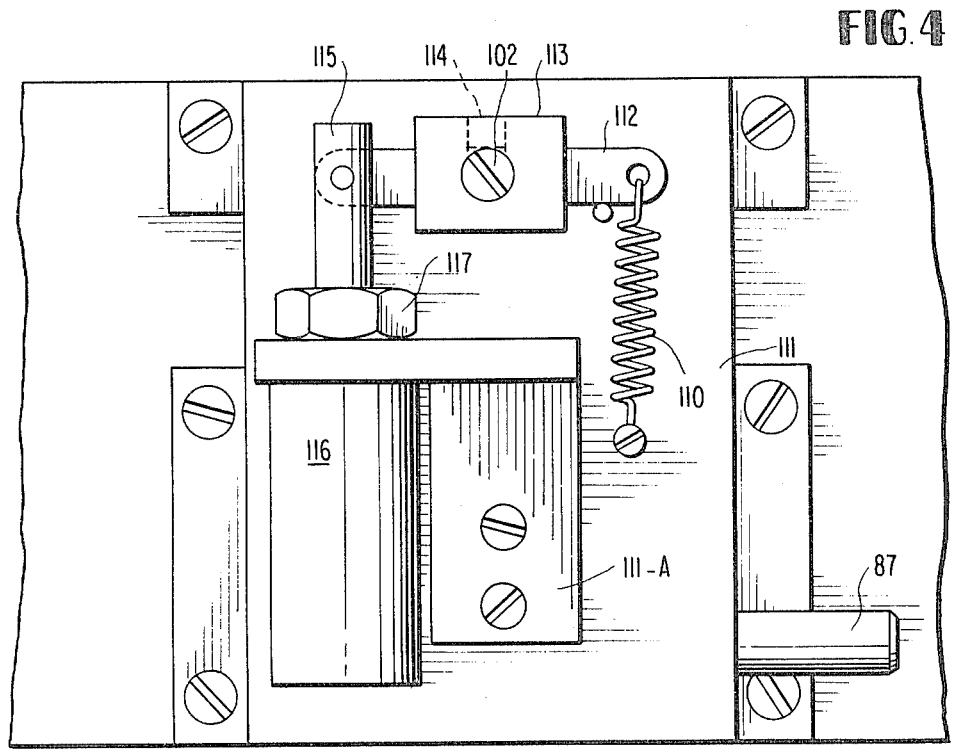

PHOTOGRAMMETRIC PLOTTER AND CONSTRAINT FREE DRIVE SYSTEM THEREFORE

BACKGROUND OF THE INVENTION

Typical photogrammetric plotter of the type in which a photocarriage is supported on way bars for movement in orthogonally related X Y directions utilize hand wheel driven screws for positioning photocarriages in both X and Y directions. Some of these early machines utilize servo motor systems for driving the screws, the screw normally being fixed for rotation about a fixed axis relative to the direction that the photocarriage is to be moved and a follower element engages the threads of the screw to actually move the photocarriage. Amount of rotation of the screw and hence the position of the follower therealong and accordingly the position of the photocarriage relatve to the optics gives an accurate measure of the position of the measuring mark relative to coordinates of the photograph. Exact parallelism between the axes of the screws, way bars and the like on both axes must always be maintained, so as to not adversely affect accuracy of the measurements and, at the same time assure relatively easy movement of the component parts. Moreover, it is difficult to provide manual manipulation of such photocarriages to permit rapid manual repositioning of the photocarriage according to the desires of the user. Other measuring systems eliminate the carefully calibrated measuring screw and provide the electronic equivalent in the form of electronic grids, or orthogonally related linear position transducers moved therealong for deriving positioning information, one part being mounted on the base and the other part mounted on the movable element which is the position to be measured. In such systems, the stage is driven by servo motors but the coupling of the driving force between the photocarriage and the supporting base has presented serious constraint problems which require high precision manufacturing and assembly so as to avoid binding constraints and, accordingly, are very expensive. Moreover, such systems do not permit slewing of the photocarriage stage to permit movement in any direction at high rates of speed.

BRIEF DESCRIPTION OF THE INVENTION

Photogrammetric plotters according to the present invention, which in the preferred embodiment, is incorporated in a stereoplotter, include a supporting base, a set of Y way bars secured on the base, a Y trolley (constituted by a pair of Y trolley elements, one on each Y way bar), X way bars supported on the Y trolley, and a photocarriage supported on a photocarriage trolley running on the X way bars. The photocarriage includes a photocarriage casting, a set of way bars for translating the left stage in the Y ordinate direction and a further set of way bars for translating the right photo stage in the X ordinate direction. This design is relatively simple and avoids a set of ways on ways in the confined area of the photocarriage thereby permitting the photocarriage itself to be made smaller. However, one photo stage does not move in both directions or along both ordinates relative to the other but, as will be shown later herein, locking the delta Y motion with the X motion can be provided so that the right stage has apparently both of the delta motions (delta X and delta Y) without added expense and complexity. Reference is made to page 501 of the "Manual of Photogrammetry" 3rd Edition (1963) which describes an arrangement (the Zeiss-Jena Stecometer) where the required motions are divided between upper and lower photo stages and a part of the motion was imparted to the optical system.

As is conventional, all way bars are hardened and ground steel stock of appropriate diameters to prevent deflection due to the weight of the components and the bearing assemblies are constructed so that one set of bearings are merely constrained vertically. This design allows for some slight non-parallelism in the ways without introducing stresses and, as will appear more fully hereafter, the drive systems for driving the photocarriage along the X and Y way bars accomodates this slight non-parallelism in the ways which are mounted in precision V-blocks, in sliding fashion so that differential stresses built up by the differences in thermal expansion coefficient of steel and aluminum castings for the base and photo-carriage frame cannot develop.

In a preferred embodiment, a pair of drive rods are provided one drive rod for each axis of drive of the photocarriage. Each rod is attached to the Y trolley and they are supported in orthogonally related positions and at one end only in cantilever fashion. The mounting of the drive rods is a feature of the invention in that the mounting is such that the drive rods can be displaced in directions transverse to their longitudinal axis but are immovable in directions axially along their longitudinal axis. A drive motor assembly including a V drive wheel or pulley coupled via a reduction gearing to a servo drive motor and tachometer assembly has a cam bearing positioned over the V drive wheel and a spring urges the cam bearing at all times toward the V drive wheel. In the preferred embodiment, the Y fine motion drive assembly is mounted on the base and the Y fine drive rod is positioned or releasably captured between the cam bearing and the V drive wheel. A solenoid which forms a part of the fine motion drive assembly is controlled by a switch mounted on the photocarriage so as to rotate the cam bearing to a position of disengagement and the drive rod is free of driving contact with the drive wheel thereby permitting the photocarriage to be manually slewed by the operator at very high rates without damaging the equipment. The drive rods themselves, being mounted so that they may be deflected transversely of their longitudinal axis but being constrained axially so that they cannot move provides a substantially constraint free drive assembly.

The photocarriage itself carries a pair of mountings for left and right photos which are viewable by means of a conventional stereooptical viewer which is mounted rigidly, on the supporting base. A measuring mark is formed optically and fused with the images from the photos on the photocarrier which, in a preferred embodiment, are illuminated by planar high intensity discharge lamps carried in the photocarriage, one planar illuminator for each photo.

The measurements of the stage position, both in X, Y and the delta motions is through linear encoders, which, in the preferred embodiment comprises a metal strip on which is etched a conductive medium, the readings being taken by passing an induction loop over the strip and interpreting the readings with a phase lock loop to interpolate the exact dimension or distance from a point on the metal strip. It is by virtue of these linear encoders on all axes, that a friction drive system can be utilized since all the measurements are totally independent of the drive systems in all cases, which is an important feature of the invention. In a further feature of a preferred embodiment of the invention, the X and Y drive motors for the photocarriages are driven from a conventional trackball, the signals from which are selectively fed directly to the servo amplifier for manual control or through a computer and hence back to the servo amplifier and drive motors for automatic control. This permits the automatic removal of Y parallax which makes the instrument into a true analytical plotter and in the implementation described later herein, it will be shown that it removes any real time processing requirements from a host calculator.

Figure 5:
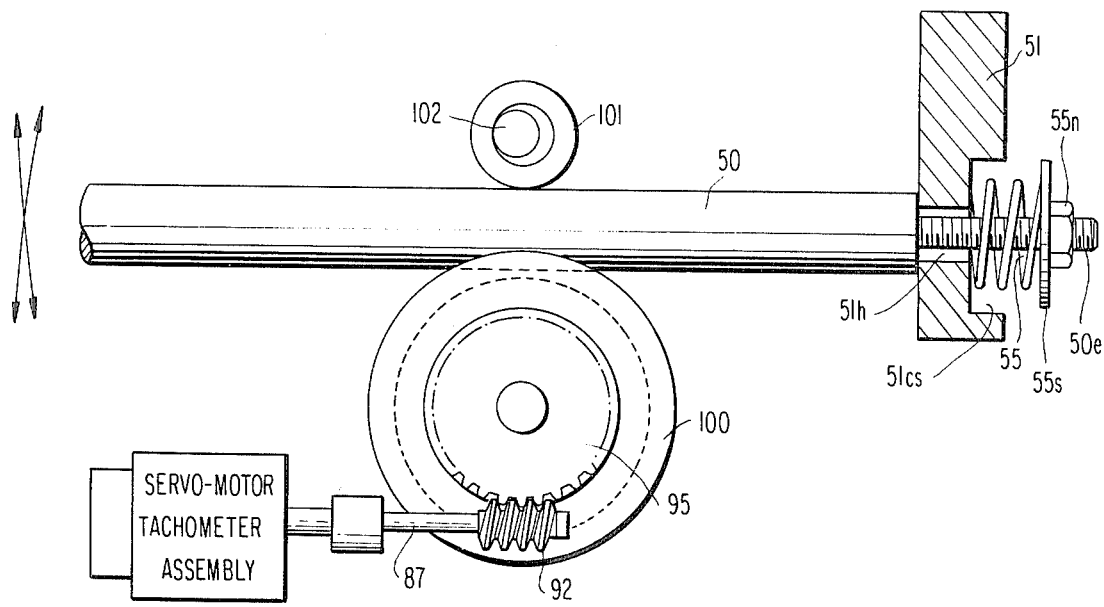
Figure 6:
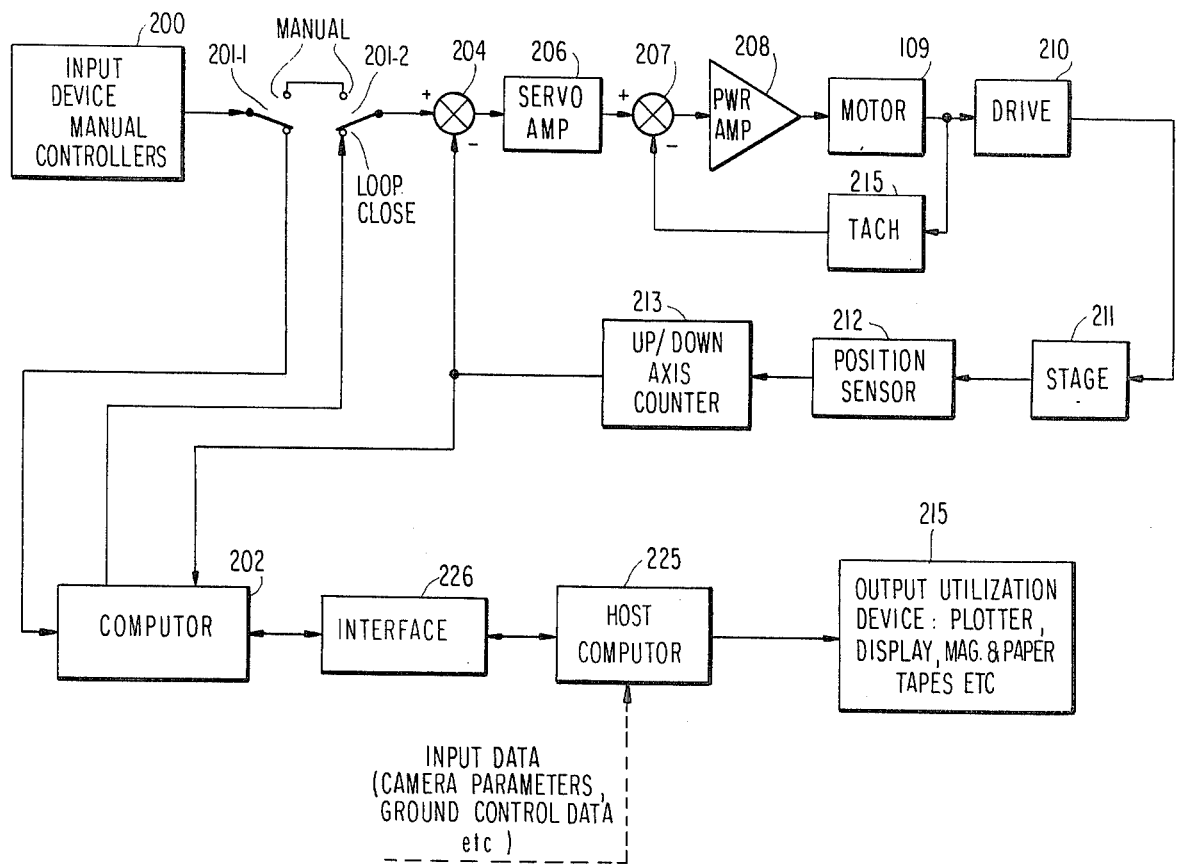

The above and other objects, advantages and features of the invention will become more apparent when considered in conjunction with the following specification and the accompanying drawings wherein:

FIG. 1 is a diagrammatic isometric view of a stereoplotter incorporating the invention, FIG. 2 is a view from one side of the fine motion drive assembly, FIG. 3 is a partial sectional view of the fine motion drive assembly with a portion thereof removed for clarity, FIG. 4 is a further view of the fine drive motion assembly from the top thereof, FIG. 5 is a detailed isometric view of one of the drive rods showing its mounting assembly, and FIG. 6 is an electronic block diagram showing the interrelationship and interconnections of the X and Y thumbwheel controls for the left and right photo servo motors, the X and Y fine drive motors, the X and Y position encoders and the computer.

Referring now to FIG. 1, the invention is illustrated as being embodied in a stereoplotter which, in FIG. 1 is shown diagrammatically as being constituted by a photocarriage 10 carrying a pair of stereo photo carriers 11 and 12 on which a pair of stereo images or photographs are mounted, a planar high intensity gas discharge lamp (not shown) being positioned beneath each photo carrier 11 and 12 to illuminate a photo transparency carried on photo carriers 11 and 12, respectively. It will be appreciated that photo carriers 11 and 12 may carry conventional opaque photographs which are illuminated by other means and viewed through an optical system 13, which is conventional and can, for example, be a Bausch & Lomb Zoom 240 binocular microscope or, for example, the Bausch & Lomb Stereo Zoom Transfer Scope. A reticle consisting of a beam splitter arrangement, which views an image of a reticle is illuminated by a high intensity adjustable tungsten lamp via a variable aperture, the reticle pin hole lying at the same optical path length from the binocular system as the imagery so that anything which affects the image position in the optics will affect the image position of the reticle in exactly the same way and eliminate measurement error due to optical system displacements. Similar optical systems are well known in the art, reference being made to the "Manual of Photogrammetry" 3rd Edition (1966) "Chapter 14" Plotting Machines With Mechanical or Optical Trains; which is incorporated herein by reference.

The left stage 11 is adjustable along the Y ordinate by a servo motor 11s and the right stage 12 is adjustable along the X axis by a servo motor 12s, such servo motors selectively receive control signals from X and Y thumb wheel controls 14 and 16, respectively which are housed in a control box 17 or the computer of FIG. 6.

Each of the thumb wheels 14 and 16 controls an encoder which sends encoded servo control signals to the computer (FIG. 6) which supply the signals to servo motor 11s and 12s respectively. The drives for the delta X and delta Y motions are commercial Rohli friction drive actuators which are also driven by the servo motors. As will be described later herein, during the operation of the instrument, photographs are placed on the photo carriers 11 and 12, respectively, and are adjusted for orientation marks typically located on such photos and/or several land marks on each of the photos are collated so as to achieve, as in conventional, as distortion free stereo model as is possible.

Photocarriage 10 is moutned on trolley 20 which, in turn, is supported on bearings on a pair of X way bars 21 and 22 of the character described above. The X way bars 21 and 22 are themselves supported in precision V blocks in sliding fashion so that differential stresses built up by differences in the thermal expansion of steel and aluminum cannot develop. Such V blocks are carried in Y trolley elements 31 and 32 respectively which, for purposes of this disclosure constitute Y trolley. The Y trolley elements 31 and 32 are mounted on a Y way bars 33 and 34, respectively, which are supported at their respective ends by V blocks 35 and in sliding fashion so that differential stresses built up by difference in thermal expansion coefficients of steel and aluminum do not develope. All of the ways are adjustable for orthogonality without significant disassembly of the instrument by adjustment screws and the like (not shown). As mentioned earlier, one of the trolleys has a three bearing support constituted by bearings angularly spaced around the way bars and the other of the trolleys has a two bearing support, the bearings being in opposing relation in a vertical direction. Thus, the bearing assemblies in all cases are arranged so that one trolley on each pair of ways is constrained in two dimensions whereas the other trolley is merely constrained vertically which allows for some slight non-parallelism in the ways without introducing stresses or other constraints.

Thus, the Y trolley moves in the Y direction indicated by the arrow 38 and the X trolley moves in the X direction indicated by the arrow 39.

Movements of the photocarriage 10 relative to base 40 in both X and Y directions are, in purpose and effect, the movements of the measuring mark introduced into the binocular system 13 over the stereo model, and, hence, measurements of the X and Y coordinates of any selected position the stereo model. The measurements of the movements of the photocarrier stages 11 and 12 in Y and X, respectively, provide the delta X and delta Y measurements for parallax, thereby providing all of the measurements necessary for photogrammetric purposes. The X ordinate measurement of the photocarriage stage 10 is by means of a linear encoder 41 which, in the preferred embodiment, includes a metal strip on which is etched a conductive medium, the readings being taken by an inductive loop 42 carried on X trolley 20, the signals induced in the inductive loop being interpreted with a phase lock loop to interpolate the exact dimension-position of the loop 42 relative to a selected point or end of encoder 41. A second encoder 43 is provided for the Y measurement axis with its inductive loop (not shown) being carried by Y trolley element 32. It will be appreciated that various other forms of electronic position measurement may be utilized to obtain the exact location of the photo-carriage 10 relative to the measuring mark of the binocular viewing system 13.

Linear encoders as used herein are marketed under the Trademark Farrand INDUCTOSYN.

X AND Y FINE MOTION DRIVE ASSEMBLIES

With the photocarriage 10 mounted on X trolley 20, the photocarriage 10 is freely movable to any position so that the operator can rapidly slew the photocarriage to position the pair of photos under the binocular viewing system 13 and hence the measuring mark at any point desired in the stereo model. A significant feature of the invention is the provision of fine drive assemblies for driving the photocarriage and, at the same time, disengaging (declutching) the drive without imposing any constraints between the driving and driven parts or any impediment to movement of the photocarriage 10 relative to the base, when the operator so desires such freedom of movement. Referring again to FIG. 1, such drive assembly is shown as being constituted by a pair of drive rods, X drive rod 50 mounted on bracket arm 51 secured in turn to Y trolley element 32 and Y fine drive rod 55 secured at one end to mounting bracket 56 which, in turn, is secured to Y trolley element 32. Each drive rod 50, 55 is mounted at one end only, the details of the mounting being shown in FIG. 5 and described more fully hereafter. Each drive rod 50, 55 is mounted in cantilever fashion such as to permit movements of each drive rod transverse to the direction of drive and the longitudinal axis thereof but is constrained against any movement in a direction axially thereof. Thus, any non-parallelism between the drive rods and the desired direction of movement (X and Y directions) of the photocarriage 10 are permitted to cause relatively free movement or deflection of the drive rod. As will be shown hereafter, each drive rod is releasably frictionally coupled to a fine drive motor-clutch assembly which is illustrated in detail in FIGS. 2, 3 and 4. However, for purposes of illustrations in FIG. 1, the drive motor for the X axis drive rod 55 is shown as constituted by a V drive wheel 100 secured commonly to a shaft with worm wheel 95, which is in drivingly engaged with a worm gear 92 whose shaft 87 is coupled to a servo motor tachometer 89. A bearing 101 on a cam shaft is urged into an engagement with the upper surface of drive rod 55 by a spring (see FIG. 5) Thus, whenever servo motor tachometer 89 drives shaft 87 and worm gear 92, worm wheel 95 is rotated to drive shaft and V drive wheel 100 to thereby pull or push depending on the selected direction of drive for the servo motor 66 photocarriage 10 in the Y direction 38. The drive motor assembly for the X drive rod 50 is mounted in the underside of photocarriage 10.

Referring now collectively to FIGS. 2, 3, 4 and 5 each fine drive assembly includes a pair of housing plate members 80 and 81 secured to mounting plate members 83 and 84, the mounting plate members having shoulders 86 and 87 for securing the unit in the wall of the case/base housing element 40 or in the underside of the casting for photocarriage 10. A worm gear drive shaft 87 coupled by a union to servo motor 89 is mounted in bearings 90, 91 of mounting plates 83, 84 respectively. Worm gear 92 is splined to drive shaft 87 and meshed with worm wheel 95. Worm wheel 95 is in turn splined to drive wheel shaft 93 which is journaled in bearings 94 in housing plates 80 and 81 respectively. Drive wheel 100 is splined to drive wheel shaft 93 so that it is therefore driven by the servo motor via worm wheel shaft 87, worm gear 92 and worm wheel 95. Each drive wheel has a V periphery and the drive rods 50 and 55 are releasably retained within the V of the drive wheels. Driving engagement of the drive rod with the drive wheel 100 is effected by a cam bearing assembly 101. Cam bearing element assembly 101 is mounted on a cam shaft 102 which is eccentrically mounted in bearings 104-105.

The cam shaft is rotated in a direction to cause the bearing assembly 101 to bear against the upper surface of the drive rod to thereby tightly squeeze or engage the drive rod between the outer surface of the cam bearing assembly 101 and the side walls of V drive wheel 100. Thus, whenever the servo motor 89 drives the V drive wheel as described above, the drive rods are pulled or pushed, as the case may be relative to the drive assembly. As shown in FIG. 4, a spring 110 is secured at one end to a solenoid plate 111 and at the other end to a solenoid lever 112. Solenoid lever 112 has a block 113 thereon through which cam shaft 102 passes and is secured thereto by set screw 114. Solenoid lever 112 is pivotally linked to the end of the armature 115 of solenoid 116. Locking nut 117 secures the solenoid to sub-plate 111-A. Solenoid 116 is controlled by a switch 120 (See FIG. 1) mounted on the side of photocarriage 10. Thus, when the solenoid is actuated, solenoid lever 112 is rotated counterclockwise (the directional orientation is with respect to FIG. 2) cam shaft 102 is rotated counterclockwise which rotates the cam and cam bearing 101 so as to remove the engagement of drive rod 50 or 55 with the drive wheel 100. Thus, the photocarriage stage 10 may be freely moved to thereby slew the photocarriage relative to the binocular viewing system and the measuring mark without any impediments to this movement.

In FIG. 5, it will be noted that each of the mounting brackets for the drive rods, for example in the case of FIG. 1 mounting bracket for drive rod 50, 51, has an enlarged aperture or mounting hole 51h and that the drive rod has an extended end 50-e which is of reduced diameter which is significantly less in diameter than the diameter of hole 51-h in drive rod mounting bracket 51. Extension 50e is threaded and receives telescopically thereover coil spring 55 which is retained in position by a large washer 55s and retained in position by nut 55n on the threaded end of 53e of shaft 50. Hole 51h is not as large in diameter as drive rod 50 so that the end of drive rod 50 rests on mounting bracket 51. A counter bore 51cs and the end of mounting bracket 51 permits an accomodation of the coil spring. By tightening or loosening nut 51n on the end 50-e, spring 55 is compressed or decompressed thereby adjusting the force or resistance to displacement of the drive rod to transverse displacements. The force of the solenoid spring can also be adjusted to adjust the amount of frictional engagement of the drive rod with the V drive wheel or pulley.

This arrangement permits the movement of the drive rod in directions transverse to the longitudinal axis LA thereof but substantially constrains movement along the longitudinal axis LA. The reduced diameter of rod 50e in relatively large hole 51h in mounting bracket 51 permits a relatively wide degree of movement of drive rod 50. If the opposite end of the drive rod 50 were constrained in any way, such movement would not be accomodated in any way and hence, there could be constraint due to non-parallelism and manufacturing tolerances which could distort the movement of the photocarriage relative to the photos and the position transducers, the degree of movement causing error. Thus, it can be seen that the drive arrangement of the present invention provides significant advantages over prior art drive systems which were not constraint free in terms of the improved performance of the instrument and, at the same time, reducing substantially the cost of the instrument by elimination of precision requirements of prior art drive and measuring means.

While the cantilevers support arrangement for the drive rod is preferred, it will be appreciated that both ends of the rod may be mounted for movement transverse to the longitudinal axis of the drive rod and contained against axial movement to achieve a constraint free drive system according to the invention. Moreover, while in the preferred embodiment, the drive rods are displced transversely to the direction of drive, the drive motor itself can be mounted to accomodate at least part or all of the transverse motion.

Referring now to the general block diagram shown in FIG. 6, an input device 200 may be constituted by the thumbwheel encoders 14 or 16 for adjusting photo carrier 11 via servo motor 11s or photo carrier 12 via servo motor 12s, or inputs from trackball unit* 9.

*Such trackball units are commercially available from Measurement System Inc. of Norwalk, Conn. The thumbwheel encoders are commercially available from Disc Instruments Corp. of Costa Mesa, California. The linear encoders are commercially available from Farrand Controls Corp. of Valahalla, N.Y.

As shown in FIG. 1, the trackball unit 9 has a rotatable ball 60, a portion of which projects above the surface 62 of the housing for manipulation by the user. X, Y sensors-encoders sense the movements of the trackball 60 to control the X, Y position of the carriage 10.

These are coupled through a control designated generally as manual control 201 so that such signals either pass directly to the servo motor drive stages or computer 202. With switches 201-1 and 201-2 in the "manual" position, signals from the input device 200 are passed directly through a summer 204 to a servo amplifier 206. The output from the servo amplifier 206 is supplied to a second summer 207 and hence to power amplifier 208 the output of which is used to drive the servo motor 109 which, in turn drives the drive apparatus 210 which thereby shifts the stage 211. The drive motor 209 can, for example be the servo motor 89 of FIG. 1. Drive mechanism 210 is the equivalent of worm gear 63 worm wheel 62 and pulley 210. The stage 211 can be the apparatus which is connected to the part driven, for example, photocarriage 10. The position of the stage 211 is sensed by a position sensor 212 which provides a feedback to summing point 204 and, also to computer 202. As noted earlier, the motor includes a tachometer which is illustrated in the block diagram as element tachometer 215 which is coupled directly to the motor shaft 209 and produces a voltage proportional to the drive velocity of motor 109 and supplies a feedback to summer 207. The position sensor 212 may be the same as elements 41 and 42, respectively for the X and Y axes, respectively of movement of the photocarriage 10. As is conventional, camera parameters and ground control data are stored in the computer 202 and in addition to processing the position data from input devices 200 when switch 201-1 is in the loop close position along with switch 201-2, computer 202 supplies an output to a utilization device 215 which may be a further computer, plotting device or a storage device such as magnetic tape.

Briefly described, the computer system 202, comprises a plurality of microprocessor computers not shown, linked together such that each computer forms the intended function in parallel with the other microprocessor computers, yet providing for interaction between the microprocessor computers when necessary. For example, four of the microprocessors monitor each of the axis counters (X, Y, delta X and delta Y) respectively, provide the current reading of the counters when required, and update the displayed coordinates to the current stage position. In FIG. 6, one such axis counter 213 illustrated in the general block diagram, other microprocessors serve to control the servo systems, both to pass information from the trackball unit 9 and thumbwheel manual controllers 17 to the servos in manual mode, and to provide an interface between photogrammetric computations in computer 202 and the servo when in the loop close mode.

The overall operation of the instrument is provided by the computer 202, provides communication to a host computer 225 which can be a general processor of the user system; interface is over an industry standard RS-232c interface 226. Computer 202 also contains photogrammatic sections which are involved in the maintenance of the stereo model, e.g., they perform the usual photogrammatic computations using various input data (camera parameter, ground control data, etc.) referred to herein as loop closing. The stereo model is maintained by the photogrammetic section which includes other microcomputers which operate in parallel to continuously solve the equations which are well known to those skilled in the art as the photogrammetric colinearity equations. The results of this solution are outputted to the servo controls which in turn drive the stages to insure that the measuring marks appear to lie over images of identical ground objects in each of the two photographs.

All of the servo motors are controlled by the closed loop servo system, each system being conventional and consisting of an up/down count register, a digital to analog converter to determine output voltage, and the close loop amplifier 206 which converts the input voltage plus tachometer feedback voltage to the output voltage for the motor. Each counter is incremented by counts from either the thumbwheels or trackball, as the case may be or can be parallel loaded from the loop close circuit (which is constituted by a microprocessor) in computer 202 when the loop close option is present. The voltage output to the servo is controlled by the magnitude and sign of the number in the register. As the counts are input from linear encoders on the respective axes, the counters are counted down until at zero the servo motor motion stops. As is also conventional, the output is controlled so that the velocity of the stages slows them up so that there is minimum overrun of the zero position, and no oscillation in the servo system.

In the free wheeling mode, effected when the solenoid control switch 120 is actuated to rotate the cam bearing and free the drive rods, the servo counter is automatically set to zero so that the motors do not run. However, counting in a position counter still occurs during the free stage motion so that the stage position is not lost. The trackball is housed in a box which rests on a table and the delta X and delta Y thumbwheels in box 117 and hence these boxes may be moved to any position which is comfortable for the operator and even exchanged in position for left handed operation.

While the preferred embodiment of the invention has been described and illustrated, it will be appreciated that various changes, modifications, and adaptions of the invention can be made without departing from the spirit and scope of the invention as set forth in the appended claims.

What is claimed is:

1. A photogrammetric instrument having a supporting base, way bars mounted on said supporting base and a photocarriage stage mounted on said way bars for translation along at least one selected axis, position transducer means for sensing the position of said photocarriage stage along said at least one axis and producing an electrical signal indicative of said position and drive motor means operating between said base and said photocarriages stage for driving said photocarriages stage relative to said supporting base along said axis, improvement in said drive motor means comprising a drive rod having a longitudinal axis which is substantially parallel to said at least one axis, means supporting said drive rod on one of said (1) supporting base, (2) photocarriage stage so as to allow said rod to pivot and move transverse to its longitudinal axis, said drive motor means including means for engaging said drive rod, and means mounting said drive motor means on the other one of said (1) supporting base, (2) photocarriage stage such that any non-parallelism between said drive rod and the movement along said one axis will result in a displacement of said drive rod with respect to said drive motor means in directions transverse to said longitudinal axis.

2. The invention defined in claim 1 wherein said drive rod is mounted on said photocarriage stage and said drive motor means is mounted on said supporting base.

3. The invention defined in claim 1 wherein said drive rod is circular and has a mounting end, said mounting end having a reduced diameter, a mounting bracket for said drive rod, said mounting bracket having aperture therein, said aperture having a diameter substantially larger than the diameter of said mounting end but smaller than the diameter of said drive rod, and means resiliently securing the mounting end of said drive rod in said aperture.

4. The invention defined in claim 3 wherein said means resiliently mounting includes a coil spring coaxial with the reduced diameter end of said drive rod, and a nut threadably engaged with said the reduced end of said drive rod so as to provide an adjustable tension in said spring and said drive rod mounting to thereby adjust the resistance to transverse displacements of said drive rod.

5. The invention defined in claim 1 wherein said drive means releasably engages said drive rod and includes, a V shaped drive wheel and gear means coupling said V shaped drive wheel to said servo motor, a cam shaft eccentrically mounted relative to said V shaped drive wheel, bearing means mounted on said cam shaft and control means for rotating said cam shaft to bring said bearing out of engagement with said drive rod to thereby disengage said drive rod with respect to said drive assembly.

6. The invention defined in claim 5 including a spring normally biasing said bearing means into engagement with said drive rod.

7. The invention defined in claim 1 wherein there are a set of orthogonally related way bars, one for an X axis and one for a Y axis, one of sets of way bars being movably supported by the other of said sets of way bars, said position transducer means includes a position transducer for transducing the position of said photocarriage along the X axis and a position transducer for transducing the position of said photocarriage along the Y axis, a separate drive rod and drive assembly for each said X and said Y axis and a computer, switch means for selectively passing signals from said position transducers to said computer at all times and from manual control elements for each of said servo motors.

8. In a stereoplotter having a supporting base, a first set of way bars mounted in said base and a pair of trolley elements movably mounted on said first set of way bars, a second set of way bars supported on said trolley elements, a photocarriage mounted for movement on said second set of way bars, the improvement in means for driving said photocarriage along one of said sets of way bars comprising, a drive rod extending parallel to the direction of drive along one of said sets of way bars, means mounting one end of said drive rod on one of said pair of trolley elements so that said rod is displaceable transverse to the direction of drive, a rotatable drive wheel and motor for rotating same, and, means causing said drive wheel to bear on said drive rod, said drive rod being rigidly supported at said one end only in an axial direction, the mounting of said drive rod at said one end being in and permitting movements of said rod transverse to the direction of drive and the longitudinal axis of said drive rod whereby any non-parallelism between the set of way bars establishing direction of drive of said photocarriage and said drive rod results in movement of said drive rod in the fashion stated.

9. The invention defined in claim 8 including a second drive rod mounted on said trolley in the same fashion as said first drive rod and orthogonal thereto, a second drive wheel, and a second means for causing said drive wheel to bear on said second drive rod to thereby drive said photocarriage in a direction transverse to said first direction.

10. The invention defined in claim 8 wherein said means mounting one end only to said drive rod in cantilever fashion includes, a drive rod mounting bracket secured to one of said pairs of trolley elements, said mounting bracket having an aperture therein.

an extension on said drive rod, said extension having a diameter which is less than the diameter of said aperture and passing therethrough, and means between said mounting bracket and said elongated drive rod resiliently maintain the longitudinal axis of said elongated rod.

11. In a photogrammetric instrument having a supporting base, an optical viewing system on said base, a photocarriage for carrying at least one photo under said optical viewing system, a position transducer for sensing the position of the photocarriage relative to said base and said optical viewing system and producing electrical information signals and applying same to a utilization device, and motor means for driving said photocarriage along at least one selected linear path, the improvement comprising, said motor means being a slippable friction drive said slippable friction drive includes means for declutching said slippable friction drive to permit freewheeling manual movement of said photocarriage with respect to said optical viewing system said position transducer is at all times adapted to sense the position of said photocarriage.

12. The invention defined in claim 11 wherein said motor means includes a V-wheel, a drive rod supported in cantilever fashion, solely at one end from said photocarriage and having a longitudinal axis substantially parallel to the direction of drive, said drive rod being displacable transversely of said longitudinal axis upon the lack of parallelism between said drive rod and said selected linear path.

13. The invention defined in claim 12 including at least one further motor means and cantilever mounted drive rod constituting a second slippable friction drive for driving said photocarriage along a orthogonally related linear path.

14. The invention defined in claim 13 wherein each of said slippable friction drives includes means to disengage said drive so as to permit said photocarriage to be freely and manually positioned by the operator.

* * * * *